(12) United States Patent
Gschwind et al.

(10) Patent No.: US 10,067,716 B2
(45) Date of Patent: *Sep. 4, 2018

(54) INACCESSIBILITY STATUS INDICATOR

(71) Applicant: INTERNATIONAL BUSINESS MACHINES CORPORATION, Armonk, NY (US)

(72) Inventors: Michael K. Gschwind, Chappaqua, NY (US); Brett Olsson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/941,572

(22) Filed: Nov. 14, 2015

(65) Prior Publication Data

US 2017/0003914 A1 Jan. 5, 2017

Related U.S. Application Data

(63) Continuation of application No. 14/755,420, filed on Jun. 30, 2015.

(51) Int. Cl.
*G06F 3/06* (2006.01)

(52) U.S. Cl.
CPC .......... *G06F 3/0659* (2013.01); *G06F 3/0619* (2013.01); *G06F 3/0673* (2013.01)

(58) Field of Classification Search
CPC ..... G06F 3/0659; G06F 3/0619; G06F 3/0673
See application file for complete search history.

(56) References Cited

U.S. PATENT DOCUMENTS

| 5,903,739 | A  | * | 5/1999  | Dice      | G06F 9/30043 |
|           |    |   |         |           | 712/216      |
| 7,707,464 | B2 | * | 4/2010  | Gilgen    | G06F 13/24   |
|           |    |   |         |           | 710/20       |
| 8,738,860 | B1 |   | 5/2014  | Griffin et al. |         |
| 9,286,076 | B2 |   | 3/2016  | Belmar    |              |
| 2006/0092165 | A1 | * | 5/2006 | Abdalla | G06F 9/52 |
|           |    |   |         |           | 345/545      |
| 2006/0149892 | A1 | * | 7/2006 | McFarling | G06F 12/08 |
|           |    |   |         |           | 711/103      |
| 2007/0294496 | A1 | * | 12/2007 | Goss    | G06F 12/1408 |
|           |    |   |         |           | 711/163      |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

"Power ISA™ Version 2.07B," International Business Machines Corporation, Apr. 9 2015, pp. 1-1526.

"z/Architecture—Principles of Operation," IBM® Publication No.,: SA22-7832-10, Eleventh Edition, Mar. 2015, pp. 1-1732.

(Continued)

*Primary Examiner* — Ramon A. Mercado
(74) *Attorney, Agent, or Firm* — Heslin Rothenberg Farley & Mesiti P.C.

(57) ABSTRACT

Processing within a computing environment is facilitated by use of an inaccessibility status indicator. A processor determines whether a unit of memory to be accessed is inaccessible in that default data is to be used for the unit of memory. The determining is based on an inaccessibility status indicator in a selected location accessible to the processor. Based on the determining indicating the unit of memory is inaccessible, default data is provided to be used for a request associated with the unit of memory.

6 Claims, 15 Drawing Sheets

(56) References Cited

U.S. PATENT DOCUMENTS

| | | | |
|---|---|---|---|
| 2010/0095075 A1* | 4/2010 | Ganesh | G06F 12/1072 711/161 |
| 2011/0004739 A1* | 1/2011 | Hohmuth | G06F 12/1009 711/207 |
| 2011/0016291 A1* | 1/2011 | Kuo | G06F 9/30076 711/214 |
| 2011/0060887 A1* | 3/2011 | Thatcher | G06F 3/0604 711/171 |
| 2011/0314263 A1 | 12/2011 | Greiner et al. | |
| 2013/0159662 A1* | 6/2013 | Iyigun | G06F 12/08 711/206 |
| 2013/0246738 A1 | 9/2013 | Bradbury et al. | |
| 2013/0339672 A1 | 12/2013 | Jacobi et al. | |
| 2015/0033038 A1 | 1/2015 | Goss et al. | |
| 2015/0035840 A1* | 2/2015 | Koker | G06T 1/20 345/502 |
| 2015/0089146 A1* | 3/2015 | Gotwalt | G06F 12/1009 711/133 |
| 2015/0173253 A1 | 6/2015 | Lewis, II et al. | |
| 2016/0188483 A1* | 6/2016 | Gschwind | G06F 12/1009 711/206 |
| 2016/0188485 A1* | 6/2016 | Gschwind | G06F 12/1009 711/206 |
| 2016/0188496 A1* | 6/2016 | Gschwind | G06F 3/0622 710/267 |

OTHER PUBLICATIONS

U.S. Appl. No. 14/583,974, filed Dec. 29, 2014, "Processing Page Fault Exceptions In Supervisory Software When Accessing Strings and Similar Data Structures Using Normal Load Instructions," pp. 1-59.

U.S. Appl. No. 14/583,970, filed Dec. 29, 2014, "Computer Instructions for Limiting Access Violation Reporting When Accessing Strings and Similar Data Structures," pp. 1-59.

Anonymous, "Method for Enabling Misaligned Packed Data Type Instructions Load Operand Instructions," IP.com No. 000109202, Mar. 2005, pp. 1-3.

Liou, Koujuch, "Design of Pipelined Memory Systems for Decoupled Architectures," IP.com No. 000161117, Dec. 2007, pp. 1-267.

Relson, et al., IBM z/Enterprise EC12 CPU Facilities, Aug. 2013, pp. 1-62.

Gschwind et al. "Non-Faulting Compute Instructions," U.S. Appl. No. 14/755,543, filed Jun. 30, 2015, pp. 1-51.

Gschwind et al. "Inaccessibility Status Indicator," U.S. Appl. No. 14/755,420, filed Jun. 30, 2015, pp. 1-53.

Gschwind et al. "Non-Faulting Compute Instructions," U.S. Appl. No. 14/941,562, filed Nov. 14, 2015, pp. 1-47.

List of IBM Patents or Patent Applications Treated as Related, dated Mar. 14, 2016, 2 pages.

Final Office Action for U.S. Appl. No. 14/755,543 dated Sep. 20, 2017, pp. 1-37.

* cited by examiner

HASHED PAGE TABLE PTE                    600

RADIX PAGE TABLE PTE        700

INACCESSIBILITY STATUS INDICATOR

This application is a continuation of co-pending U.S. patent application Ser. No. 14/755,420, filed Jun. 30, 2015, entitled "Inaccessibility Status Indicator," which is hereby incorporated herein by reference in its entirety.

BACKGROUND

One or more aspects relate, in general, to processing within a computing environment, and in particular, to processing associated with inaccessible memory.

Memory may be organized into pages (or other sizes of units of memory), and each page includes a range of addresses specifying a plurality of memory locations. The addresses may be virtual addresses, if the environment includes virtual memory, and thus, address translation may be needed. Address translation is used in order to convert a virtual memory address to a physical or real memory address. The translation from a virtual memory address to a physical or real memory address is stored in an entry within a data structure, such as a page table entry. Additionally, the memory locations in a single page of memory typically share a common set of access permissions. Access permissions determine whether an application has privileges to read or write the contents of a memory page.

Instructions may perform operations on operands, and those operands may be specified in registers, referred to as register operands, or read from memory, referred to as memory operands. To be read from memory, access is to be permitted to the memory locations being read.

A portion of memory (e.g., a plurality of memory locations) to be accessed to populate a memory operand may be located anywhere within a memory page, including for example, near the end of a page, spanning a boundary that separates two or more different pages, or extending up to the end of a page without crossing the page boundary. An application attempting to access a portion of memory that spans a page boundary is to have a page table entry and access permissions for both pages. If the application does not have a page table entry or access to a page of memory, a page fault violation occurs when the application attempts to access the page or perform address translation for the page. In order to protect system integrity, operating systems are typically strict in not allowing applications to access a page without having the proper access permissions. Thus, operating systems typically prematurely end the offending application in response to a page fault violation.

Hardware cannot always distinguish between a page of memory that has been paged out versus a page of memory that is inaccessible (e.g., not backed in physical memory), so it relies on software support. This includes invoking a data storage interrupt in which an interrupt handler performs a search of a page table to attempt to find the appropriate page table entry. This is an expensive process involving thousands of cycles to handle the interrupt.

SUMMARY

Based on the foregoing, a need exists for a capability to facilitate the processing associated with inaccessible units of memory. In one aspect, a need exists for improving performance of the computing environment as it relates to this task.

Shortcomings of the prior art are overcome and additional advantages are provided through the provision of a computer-implemented method of facilitating processing within a computing environment. The computer-implemented method includes, for instance, determining, by a processor, whether a unit of memory to be accessed is inaccessible in that default data is to be used for the unit of memory, the determining being based on an inaccessibility status indicator in a selected location accessible to the processor; and providing default data to be used for a request associated with the unit of memory, based on the determining indicating the unit of memory is inaccessible.

Advantageously, this enables the hardware (i.e., the processor) to determine whether a unit of memory is inaccessible without an expensive interrupt.

In one aspect, the unit of memory is to be used to populate at least a portion of a memory operand to be used by an instruction, and the memory operand is populated, at least in part, by the default data.

In a further aspect, a control component receives a fault for the unit of memory. A determination is made as to whether the instruction is a non-faulting instruction, wherein a non-faulting instruction is configured not to prematurely end based on the fault. Based on the instruction being a non-faulting instruction, a determination is made as to whether the unit of memory is inaccessible in that default data is to be used for the unit of memory. Based on the unit of memory being inaccessible, the inaccessibility status indicator is set.

In yet a further embodiment, the instruction is restarted based on setting the inaccessibility status indicator.

As one example, the selected location for the inaccessibility status indicator is directly accessible to the processor absent use of a control component. Further, in an example, the selected location comprises an entry in an address translation data structure associated with the unit of memory, and in one embodiment, the address translation data structure comprises a page table accessible by the processor. In a further example, the location comprises an entry in a register, the entry associated with the unit of memory.

In one aspect, setting the inaccessibility status indicator is based on determining the unit of memory is inaccessible in that default data is to be used for the unit of memory.

In a further aspect, the inaccessibility status indicator is set based on receiving a fault for the unit of memory and a determination that address translation does not exist for the unit of memory.

Computer program products, methods and systems relating to one or more additional aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing, as well as features and advantages of one or more aspects, are apparent from the following detailed description taken in conjunction with the accompanying drawings in which:

DETAILED DESCRIPTION

In accordance with one or more aspects, a capability is provided for improving the performance of a computing environment. In particular, a capability is provided for facilitating processing associated with inaccessible units of memory, thereby improving performance.

As one example, an indicator, referred to herein as an inaccessibility status indicator or a partially inaccessible facility (PIF) indicator, is provided that indicates whether a particular unit of memory (e.g., a page of memory) is inaccessible. That is, it indicates whether the particular unit of memory is backed by memory (e.g., PIF=0) or whether default data is to be used for the unit of memory (e.g., PIF=1). This indicator enables the hardware (e.g., processor) to determine whether a unit of memory is inaccessible without causing an interrupt and without relying on a guard page (i.e., extra memory added to a page of memory). Advantageously, this saves thousands of processing cycles.

Figure 1:
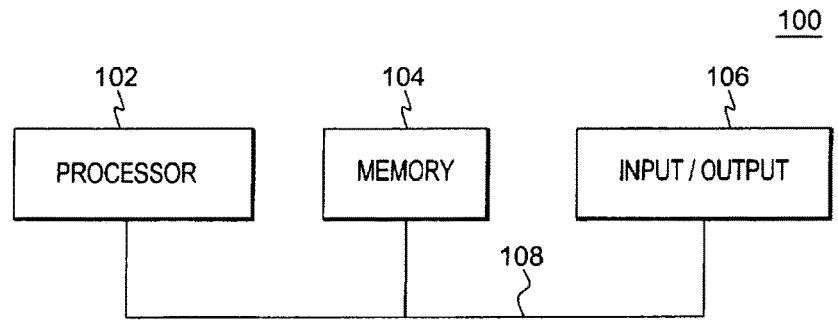
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
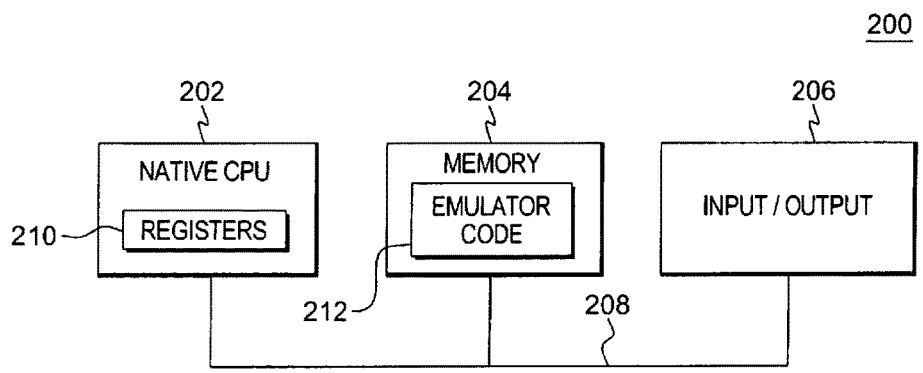
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
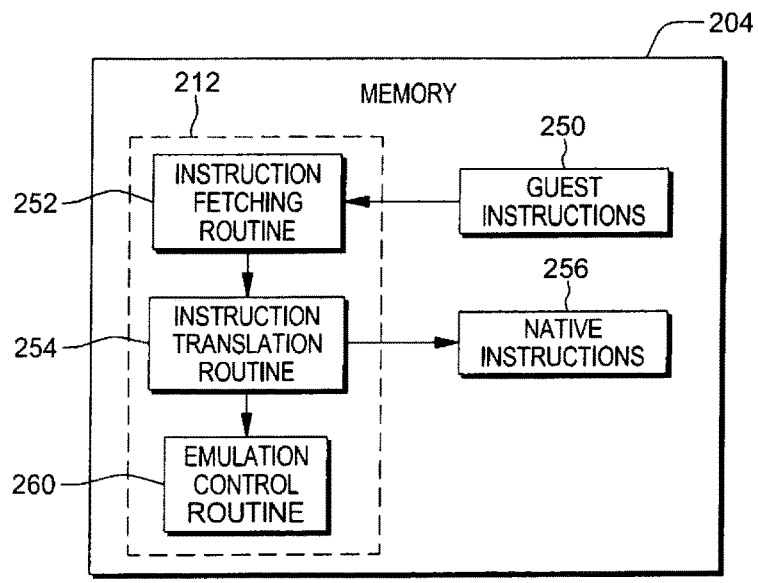
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture), is fetched from memory, translated and represented as a sequence of native instructions 256 of another architecture (e.g., the z/Architecture, Power architecture, Intel architecture, etc.). These native instructions are then executed.

An instruction, such as a load instruction or a compute instruction, may use a memory operand, and the memory to be accessed for that memory operand is to be accessible (e.g., have an address translation available in an address translation data structure and have the appropriate permissions—e.g., read access) or a fault occurs. This is true even when the memory to be accessed spans multiple units of memory.

Figure 3:
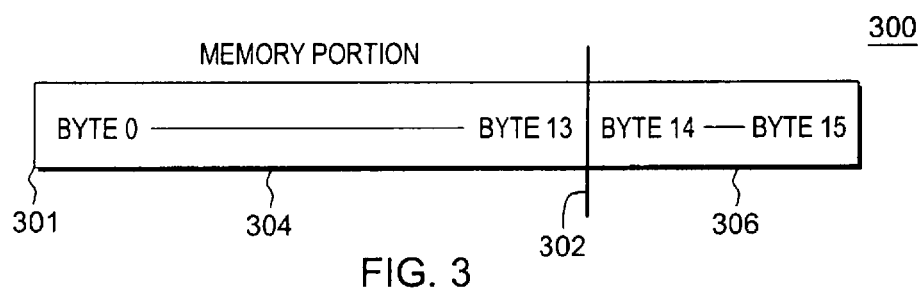
FIG. 3 depicts one example of a portion of memory spanning a memory boundary, in accordance with one or more aspects.

For instance, as shown in FIG. 3, a portion of memory 300 is depicted in which a memory operand address 301 indicates a starting location in memory from which data is to be read and placed in the memory operand. Assume 16 bytes of data are to be read and further assume that a memory boundary 302 is reached prior to reading the 16 bytes of data. Since the memory boundary divides the memory portion into a first unit of memory 304 (e.g., at least a portion of one page) and a second unit of memory 306 (e.g., at least a portion of another page), there may be different access permissions associated therewith or only one unit of memory may be mapped to memory. Thus, a check is to be made for each unit of memory of whether that portion is accessible (i.e., is there an address translation entry for that unit of memory with the appropriate permissions indicated).

If one of the units of memory is inaccessible, then a fault occurs. Typically, when a fault, such as a page fault, occurs, an interrupt handler is invoked that searches an address translation data structure (e.g., a page table) to attempt to find a mapping of the unit of memory. In the examples herein, the units of memory are pages, and therefore, the entries in the address translation data structure are page table entries; however, other sizes of units of memory may be used, and therefore, the entries may be other types of entries. Further, although the address translation data structures are address translation tables in the examples herein, other types of data structures may be used. Many possibilities exist.

To further describe, system configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

To access main memory in a system configuration that includes virtual memory, a memory access is requested that includes an effective address. The effective address is translated into a real address used to access the physical memory.

Translation is performed using an address translation technique. Several address translation techniques are available. For instance, in PowerPC systems offered by International Business Machines Corporation, an effective address is translated to a corresponding real address by way of address translation data structure entries (e.g., page table entries) found by selecting an effective segment identifier (ESID) table entry associated with the effective address, and using the entry to locate a group of page table entries by way of a hashing algorithm. This is further described with reference to FIGS. 4A-4C.

Figure 4A:
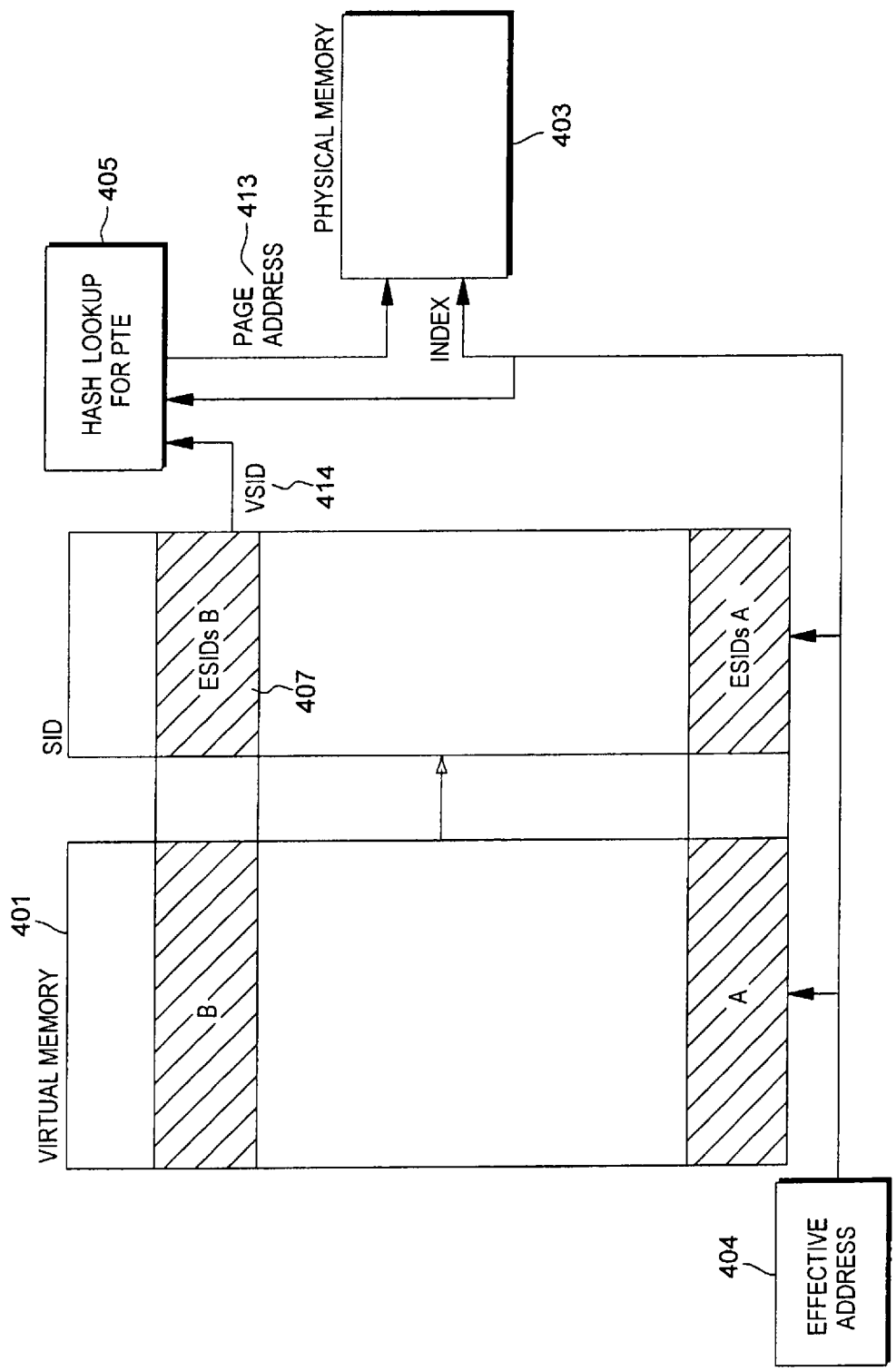
FIG. 4A illustrates an example of a high-level view of a virtual memory mapped to a physical memory using a hash page table technique.

Referring to FIG. 4A, further details regarding the physical memory used by a system and access thereto are described. As is known, physical memory is of a defined size and in order to have the physical memory appear larger than it is, virtual memory is utilized. One example of a high-level view of virtual memory 401 mapped to a physical memory 403 (such as memory 104) is depicted in FIG. 4A. In this example, the mapping from virtual memory to real memory is via a hash page table (HPT) technique 405 to locate page table entries (PTEs), as used by, for example, Power ISA (Instruction Set Architecture). In this example, programs only use sections A and B of the virtual memory. Each segment of the virtual memory is mapped to a segment ID (SID) entry 407 identified by an effective segment ID (ESID) (ESIDs for B and ESIDs for A included). An effective address 404 used by the program selects an SID entry, which includes the ESID value, as well as a virtual segment ID (VSID) 414 value. The VSID value represents the high-order bits of a virtual address to be used by hashing algorithm 405 to search the hash page table. A hashed value based on the VSID is used to locate a page table entry (PTE). The page table entry includes an address 413 of a page of physical memory 403.

Figure 4B:
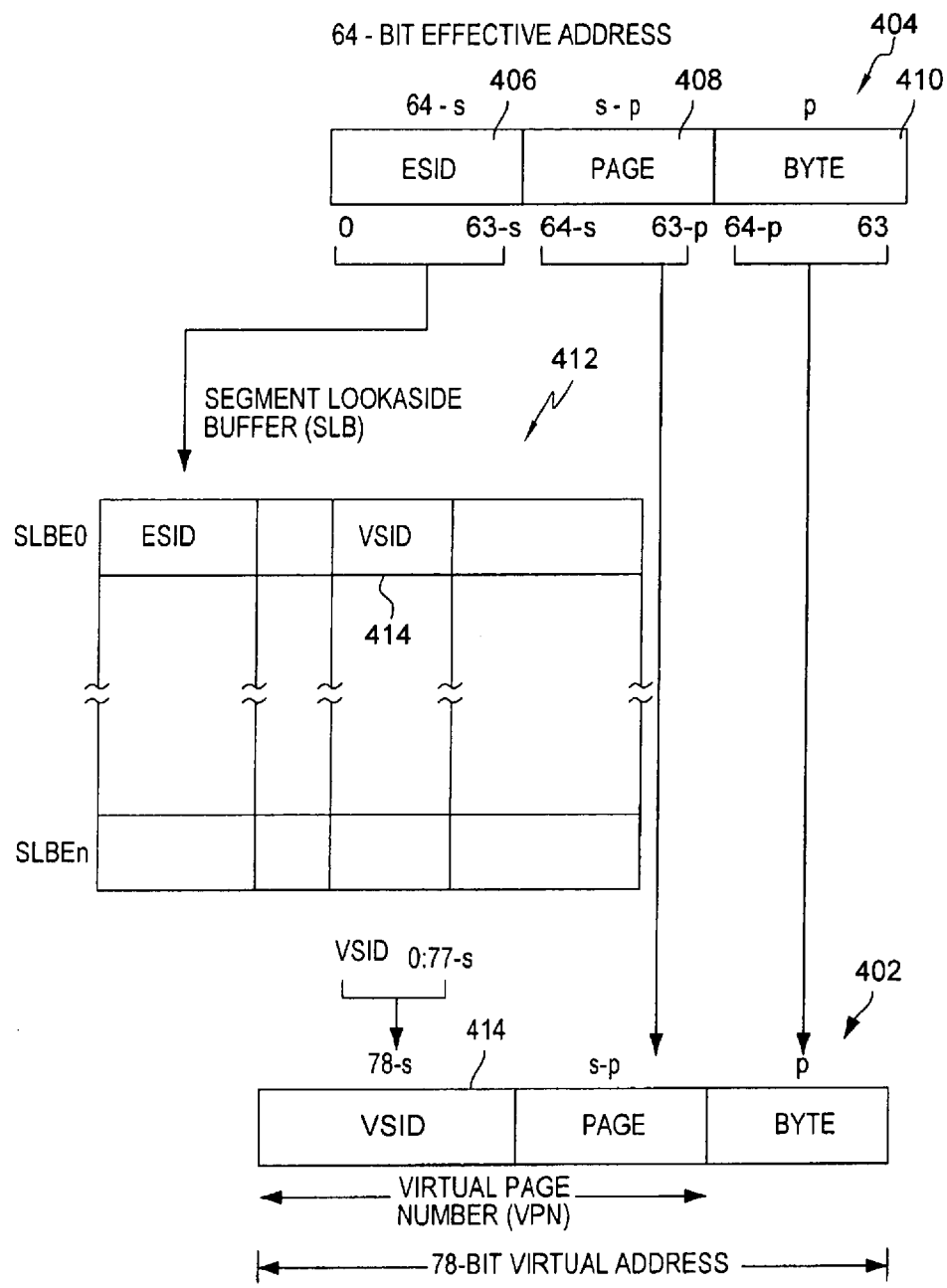
FIG. 4B illustrates one example of a technique for generating a virtual address.

FIG. 4B illustrates an example of a technique for generating a virtual address 402 for hashing. In this regard, an effective address 404 is received in, for instance, a memory management unit of a processor. Effective address 404 includes an effective segment identifier (ESID) field 406, a page field 408 and a byte offset field 410. The ESID field is used to locate an entry in a segment lookaside buffer (SLB) 412, which is a cache of recently accessed segment ID entries. In particular, the SLB is searched for an entry with a value of ESID 406 of the effective address 404. The entry with the ESID 406 includes an associated virtual segment identifier (VSID) 414, as well as other information. The associated VSID is used to generate virtual address 402, which includes VSID 414; and page 408 and byte 410 from the effective address 404. Virtual address 402 is used to obtain a real address used to access physical memory in the memory system. As used herein, the terms physical memory, real memory, system memory and absolute memory are used interchangeably to refer to the main storage accessible to a processor.

Figure 4C:
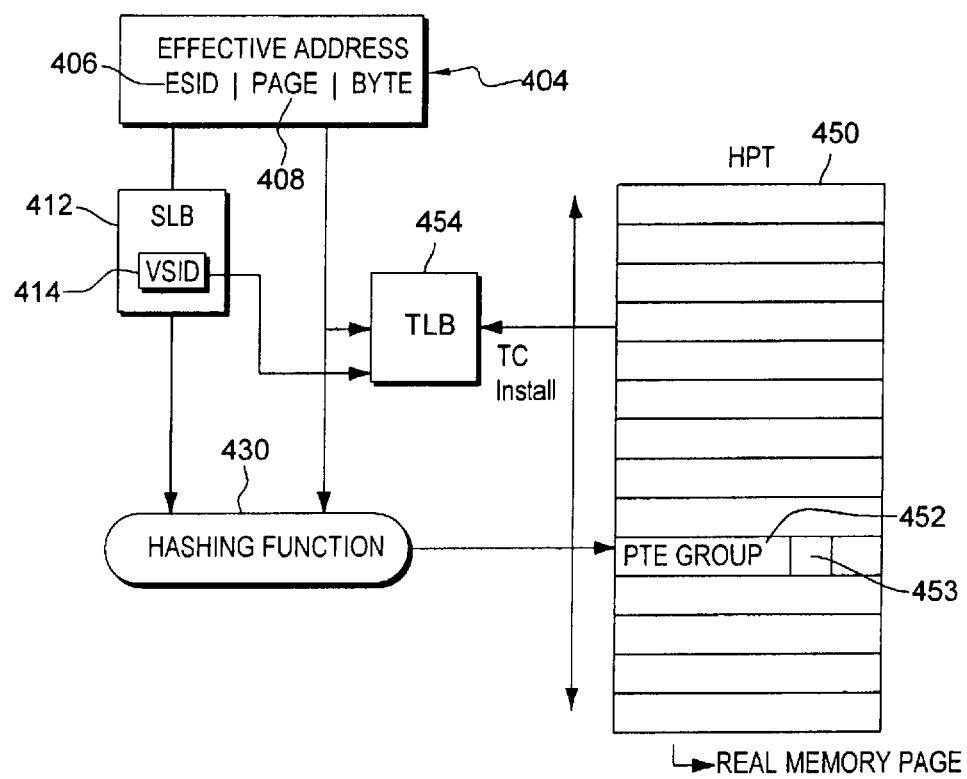
FIG. 4C depicts one example of a hash page table translation structure.

FIG. 4C illustrates an example of a hash page table (HPT) translation structure used by Power ISA. ESID portion 406 of an effective address (EA) 404 is used to locate an entry in SLB 412. The entry includes a VSID field 414. The value of VSID field 414 and a portion of EA 404 (page.byte) are hashed 430 to produce a hash value that is used to locate a page table entry (PTE) group 452 in a hash page table (HPT) 450. Page table entries 453 of PTE group 452 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 408 of EA 404 and the address of the physical memory page found in the PTE are stored in a TLB 454, such that further accesses to the same EA page will "hit" in the TLB 454 and avoid the PTE search. The page table is located by a page table origin address provided by the processor.

In a further example, in the z/Architecture, also offered by International Business Machines Corporation, an effective address is translated to a corresponding real address by way of a hierarchy of translation tables. Translation tables are indexed by a portion of the effective address to find the address of the next translation table of the hierarchy until a real (or absolute) address is obtained. One example of this translation is described with reference to FIGS. 5A-5B.

Figure 5A:
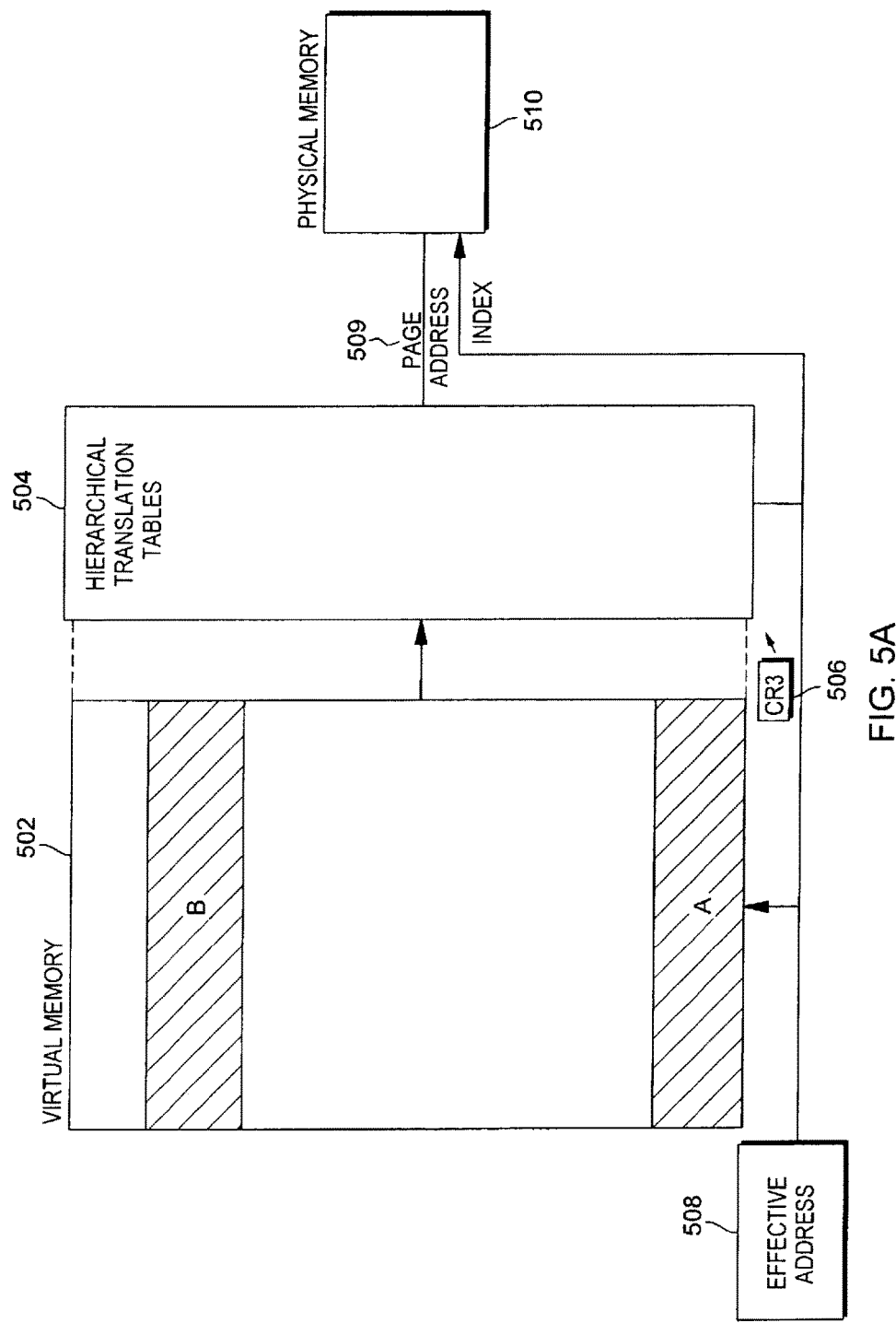
FIG. 5A depicts one example of a hierarchical translation mechanism.

Referring to FIG. 5A, one example of a hierarchical translation table translation mechanism is described. In this example, translation tables 504 are provided for translating addresses of virtual memory 502, though only regions A and B are to be used, in this example, to real addresses. The origin of the highest order translation table of the hierarchical translation tables 504, is provided, for example, by a control register (CR3) 506. An effective address 508 is used to index into each table of the hierarchical translation tables 504 to determine an origin address of the next table until, for example, a page table entry (PTE) having an address 509 of a page of physical memory 510 is located. In one example in which the translation mechanism is dynamic address translation (DAT), the effective address is a virtual address having a plurality of indices used to index into the translation tables.

Figure 5B:
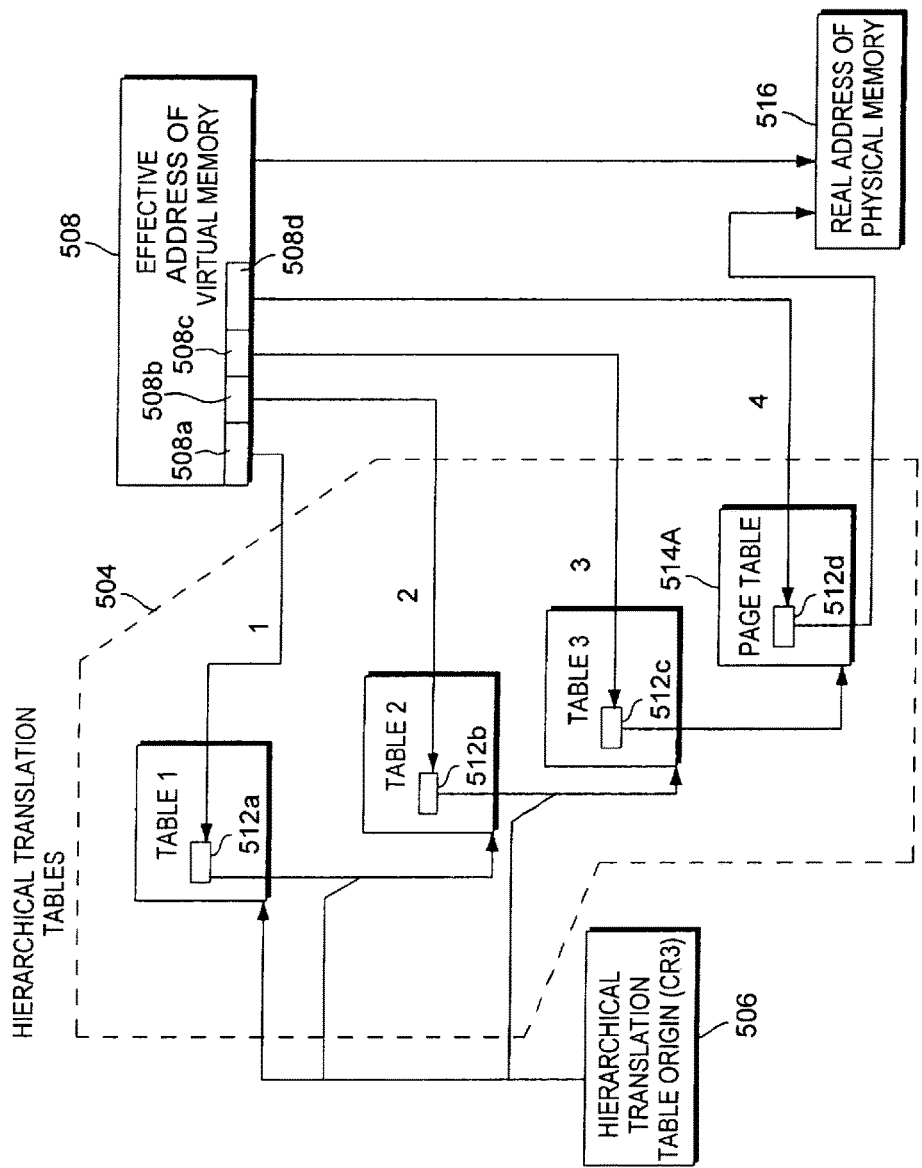
FIG. 5B depicts one example of indexing of high-level translation tables.

FIG. 5B shows one example in which the highest level translation table of the hierarchy is indexed by the high portion 508a of an effective address 508 to locate a Table 1 entry 512a that is used to locate the next translation table (Table 2). That is, entry 512a includes an origin address of Table 2. Similarly, a next portion 508b of the effective address 508 is used to index into Table 2 to find a Table 2 entry 512b having the origin address of Table 3. A next portion of the effective address 508c is used to index into Table 3 to find a Table 3 entry 512c having an origin address of a Page Table 514a. A next portion 508d of the effective address 508 is used to index into Page Table 514a to locate a page table entry 512d having the address of a physical memory page 516. The origin of the hierarchy of translation tables, in one embodiment, may include a table selector field for determining which of the hierarchy of translation tables, the origin applies. Thus, the translation may require only a subset of the hierarchy (wherein an effective address is limited to include a predetermined number of most significant bits having a zero value). A translation using fewer tables will be faster than one using more tables.

The page table entry located by traversing the hierarchical page tables includes various information including at least a portion of a real address used to access the physical memory. The format and information included in the page table entry depends on the architecture of the system configuration and/or the specific type of translation.

In one implementation, a portion of the address translation data structure (e.g., page tables) used to translate virtual addresses to real addresses to be used to access memory is cached, such that it is accessible to the hardware without employing an interrupt to the operating system. These cached address translation data structures are referred to herein as hardware address translation data structures. When the hardware is unable to find a valid entry in the hardware address translation data structures that matches the virtual address being searched, a page fault occurs and an interrupt is taken to the operating system, which then searches the entire address translation data structures.

Each page fault is expensive in terms of processing cycles to handle the interrupt; thus, a capability is provided to facilitate this processing. In one example, this capability, referred to herein as a hardware-implemented partially inaccessible operand facility (PIOF), includes extending entries of the address translation data structures to identify inaccessible units of memory. For instance, an inaccessibility status indicator (also referred to as a partially inaccessible facility (PIF) indicator) is added to, e.g., page table entries to indicate when a page is inaccessible.

Figure 6A:
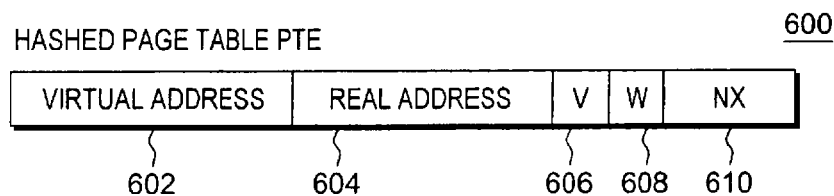
FIG. 6A depicts one example of a hashed page table page table entry.

As shown in FIG. 6A, one example of a conventional hashed page table page table entry 600 includes a virtual address 602, a real address 604 which is a translation of the virtual address, a valid indicator (V) 606 that indicates whether the page table entry is valid, a write-access indicator (W) 608 to indicate whether the page at the real address is write accessible, and a next entry (NX) 610 that points to a next page table entry in the page table.

Figure 6B:
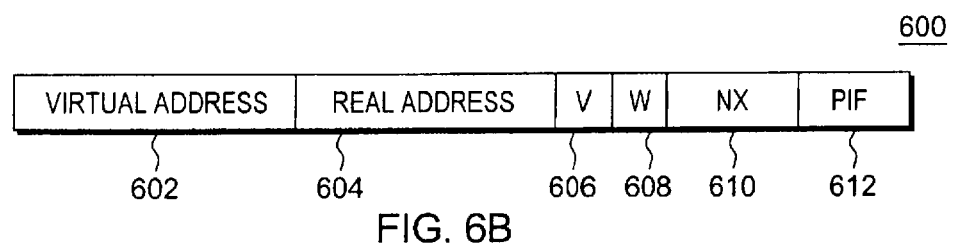
FIG. 6B depicts one example of a hashed page table page table entry modified in accordance with one or more aspects.

Further, in accordance with an aspect of the present invention, as depicted in FIG. 6B, an indicator 612 is provided, referred to as a partially inaccessible facility (PIF) indicator or an inaccessible status indicator, which is used to indicate whether a particular page is inaccessible. If the PIF indicator indicates the page is inaccessible (e.g., PIF=1), then the access cannot be performed and an indication is provided that the page is inaccessible. This advantageously provides positive feedback to hardware as to whether the page is inaccessible. However, if the PIF indicator indicates the page is accessible (e.g., PIF=0), then the page table entry is a valid page table entry, assuming other fields are valid, and the real address may be used. In a further embodiment, if PIF=0, it simply indicates the page is not inaccessible, but does not further indicate the validity of the page table entry.

Figure 7A:
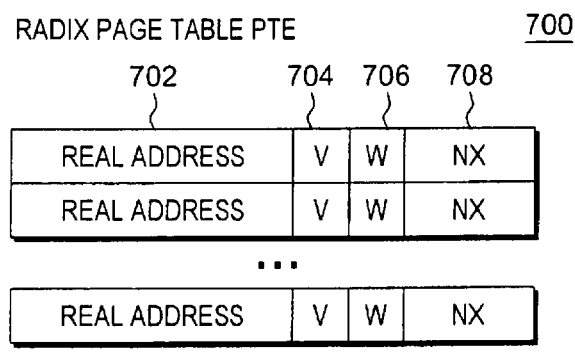
FIG. 7A depicts one example of a radix page table page table entry.
Figure 7B:
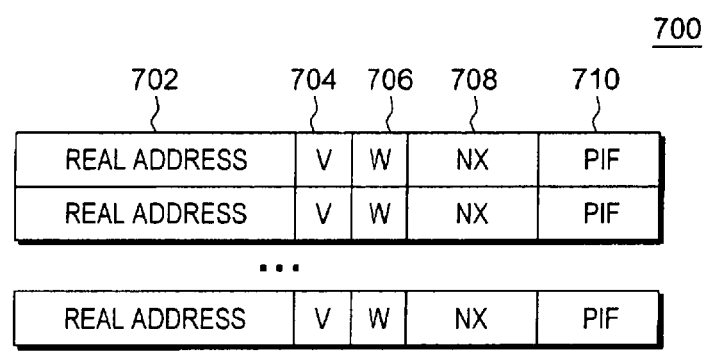
FIG. 7B depicts one example of a radix page table page table entry modified in accordance with one or more aspects.

Another example of a page table entry is depicted in FIG. 7A. In this example, the page table entry is a radix (hierarchical) page table page table entry 700 that includes a real address 702, a valid (V) indicator 704, a write access (W) indicator 706, and a next indicator (NX) 708. Further, in accordance with one or more aspects, as shown in FIG. 7B, each page table entry includes an inaccessible status indicator (PIF) 710.

Although various fields are described for the different page table entries, each type of page table entry may have additional, fewer and/or different fields. The page table entries and/or fields therein are just examples.

Figure 8:
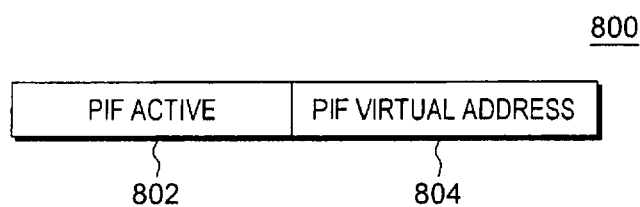
FIG. 8 depicts one example of a register to store an inaccessibility status indicator used in accordance with one or more aspects.

In a further embodiment, instead of adding an indicator to each page table entry, a register is provided that includes a last indicated inaccessible page. For instance, as shown in FIG. 8, a PIF register 800 is provided that includes a PIF active field 802 and a PIF virtual address field 804. If the virtual address associated with the memory operand is equal to the PIF virtual address in field 804 and the PIF active indicator in field 802 is set (e.g., to one), then the page is inaccessible.

Yet further, there may be an array of registers indicating multiple inaccessible pages. Many variations are possible.

Figure 9:
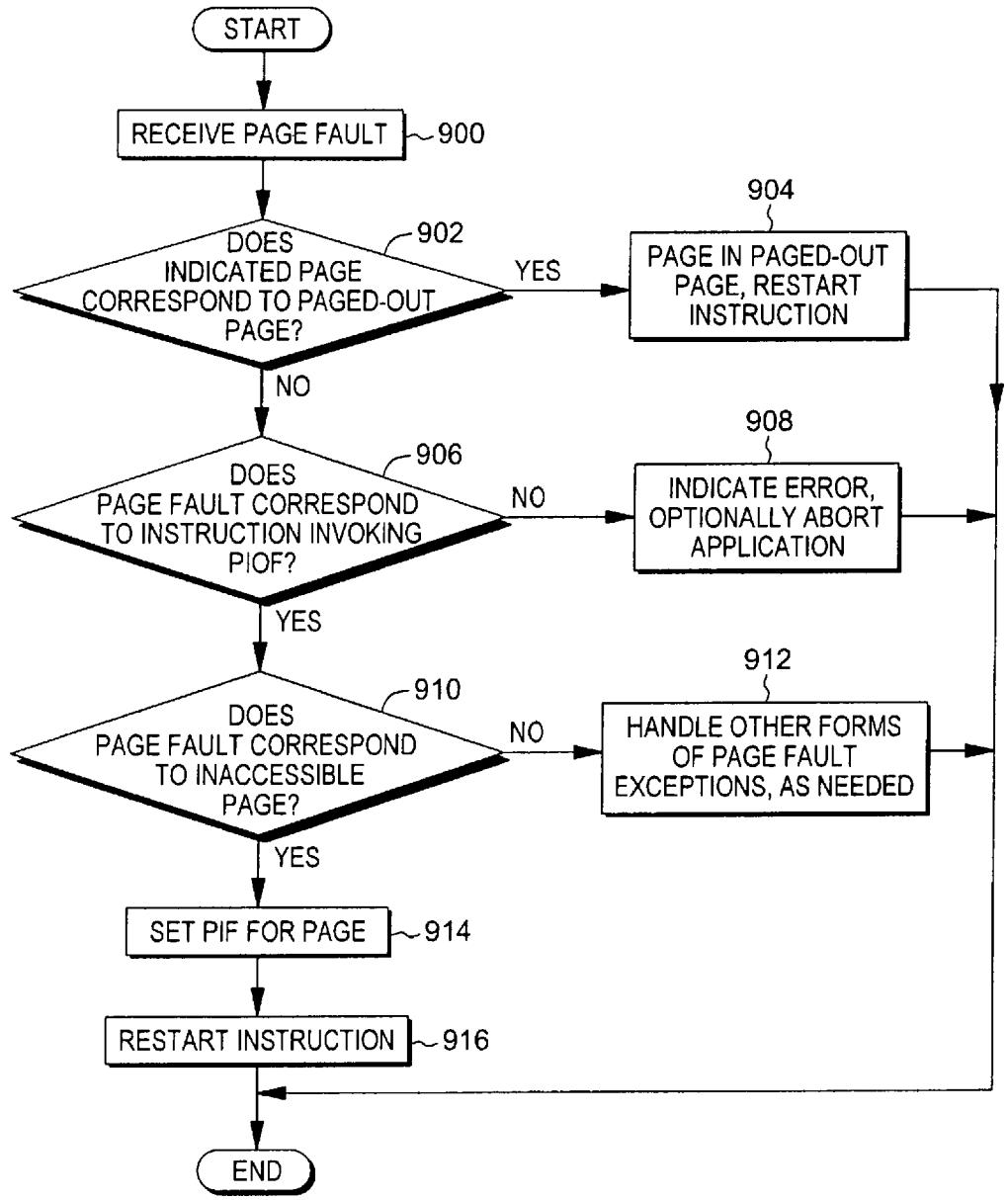
FIG. 9 depicts one embodiment of logic associated with setting an inaccessibility status indicator, in accordance with one or more aspects.

One embodiment of logic associated with installing a PIF indicator for a unit of memory is described with reference to FIG. 9. Initially, a control component, such as the operating system, receives a page fault interrupt for a particular unit of memory; e.g., a page, in this example, STEP 900. A determination is made as to whether the indicated page corresponds to a paged-out page, INQUIRY 902. That is, the operating system uses the virtual address of the page to determine if there is a page table entry in existence for the page, and thus, the page is paged out. If the page is paged out, then the operating system pages in the paged-out page, such that it is backed by memory and there is a valid page table entry in the hardware page table, and restarts the instruction, STEP 904. However, if the page is not a paged-out page, then a determination is made as to whether the page fault corresponds to an instruction invoking the partially inaccessible operand facility, INQUIRY 906. That is, a determination is made as to whether the instruction for which a memory operand is being populated is a non-faulting instruction, such as a non-faulting load or a non-faulting compute instruction. A non-faulting instruction is an instruction that does not fail based on a portion of the memory to be used to populate a memory operand of the instruction being inaccessible. This determination may be based on, for instance, the opcode of the instruction, an encoding of the instruction, processing mode of the processor, a prefix of the instruction, etc.

If the instruction is not a non-faulting instruction, then an error is indicated, and optionally, the application is aborted, STEP 908. However, if the page fault corresponds to an instruction invoking the partially inaccessible operand facility, then a further determination is made as to whether the page fault corresponds to an inaccessible page, INQUIRY 910. That is, is there no valid mapping for the page at all. If the page fault does not correspond to an inaccessible page, then there may be other forms of page fault exceptions which are handled as needed, STEP 912. Otherwise, the partially inaccessible facility indicator is set for the page, STEP 914. For instance, the indicator in one of the address translation data structure entries is set to one, or the indicator and its associated address are stored in a register. The instruction is restarted, STEP 916.

Figure 10:
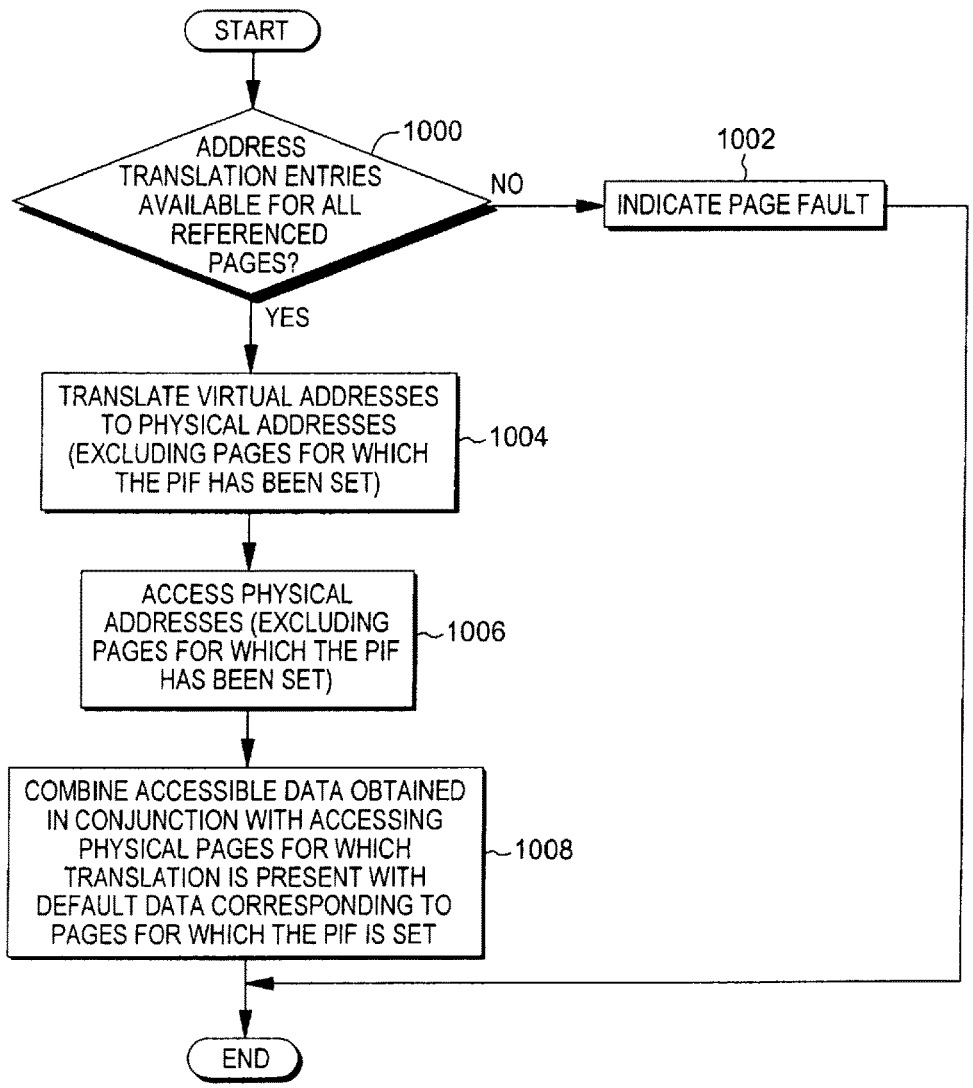
FIG. 10 depicts one embodiment of logic to use the inaccessibility status indicator, in accordance with one or more aspects.

One embodiment of using the inaccessibility status indicator (e.g., the PIF) by the processor is described with reference to FIG. 10. Initially, an inquiry is made as to whether address translation entries are available in the hardware page tables for the referenced pages, INQUIRY 1000. If not, then a page fault is indicated, STEP 1002. Processing may then continue to the processing of FIG. 9. However, if address translation entries are available for the referenced pages, then the virtual addresses to be used to populate, for instance, a memory operand are translated to physical addresses using the information in the address translation entries, excluding pages for which the PIF has been set, STEP 1004. That is, if the PIF is set, then the processor knows the page is inaccessible, so it does not translate the virtual address to a real address for any inaccessible page.

Thereafter, the physical addresses are accessed using the translated real addresses, except for those pages in which the PIF has been set, STEP 1006. Since the pages with the set PIF are inaccessible, they are not accessed. Instead, default data is used for those pages.

Subsequently, accessible data (e.g., bytes, halfwords, words, doublewords, etc.) obtained from the accessible units of memory is combined with default data (e.g., bytes, halfwords, words, doublewords, etc.) corresponding to pages for which the PIF is set, STEP 1008. The value for the default data is configurable, and may include zeros or another value. For instance, the values may target a specific application's requirements (e.g., return a sequence of 0 byte characters for null terminated string processing, return a sequence of single precision Quiet Not-a-Numbers for single precision floating point applications, etc.).

Thereafter, the memory operand may be used, for instance, in a computation or in a load.

As described herein, hardware execution is unable, at times, to differentiate between a page that is paged-out or a page that is inaccessible (i.e., there is no address translation available for the page). Thus, in accordance with an aspect of the present invention, a hardware-implemented partially inaccessible operand facility is provided to accelerate performance and simplify the structure of the supervisor software. Architectural support is provided for implementing a PIOF in hardware. With the hardware implemented PIOF, a page inaccessible facility indicator (PIF) is added, e.g., to the address translation tables and an architecturally-specified hardware PIOF function responsive to the PIF is provided in which default data (e.g., zeros or another value) is used for at least a part of the memory operand if the PIF is set.

In one further aspect, the computing environment may be a virtualized system in which a server includes one or more servers. At least one server includes memory, including one or more virtual machines and at least one hypervisor; one or more central processing units; and an input/output subsystem. Each virtual machine is capable of hosting a guest operating system and may be executing one or more applications.

In such an environment, the PIF may only be provided for an outer-most guest; or for a host; a guest; and a host and a guest, etc. In such embodiments, the PIF is stored in a memory location accessible to the guest and/or host that is to use the facility.

Although various examples are provided herein for where the PIF may be stored, other possibilities exist. For instance, it may be stored in entries at a higher or different hierarchical level (e.g., segment level, etc.) or in other locations accessible to the entries to use the PIF without causing, for instance, an interrupt.

Figure 11:
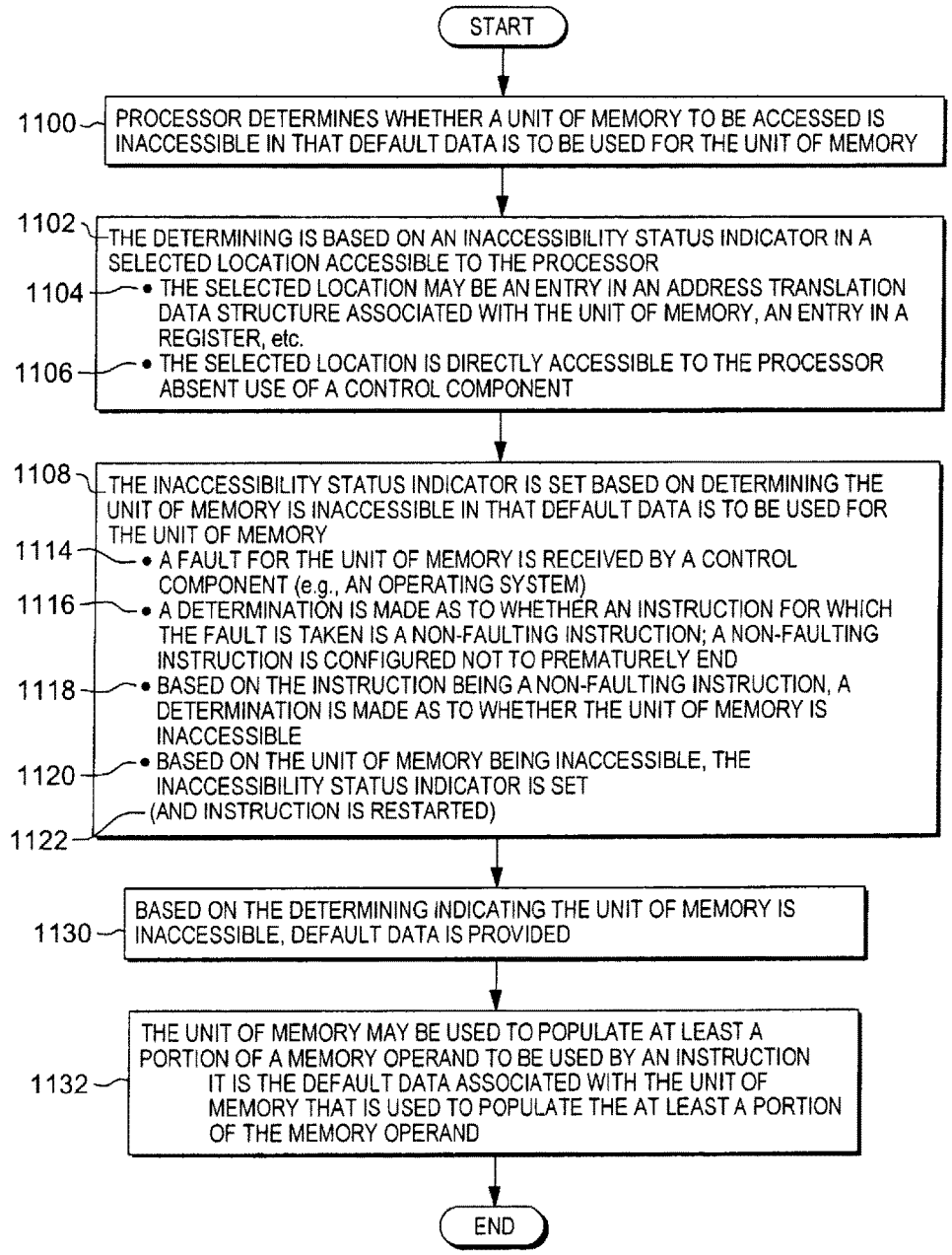
FIG. 11 depicts one embodiment of logic to facilitate processing within a computing environment using the inaccessibility status register, in accordance with one or more aspects.

As described herein, in one or more aspects, processing within a computing environment is facilitated. One embodiment of logic associated with facilitating processing is described with reference to FIG. 11. Initially, a processor determines whether a unit of memory to be accessed is inaccessible in that default data is to be used for the unit of memory (1100). The determining is based on an inaccessibility status indicator in a selected location accessible to the processor (1102). The selected location may be an entry in an address translation data structure associated with the unit of memory, an entry in a register, etc. (1104). It is directly accessible to the processor absent use of a control component (1106).

In one embodiment, the inaccessibility status indicator is set based on determining the unit of memory is inaccessible in that default data is to be used for the unit of memory, since, for instance, no address translation exists for the unit of memory (i.e., there is no physical memory to back that unit of memory) (1108), e.g., since the unit of memory. As an example, a fault for the unit of memory is received by a control component (e.g., an operating system) (1114). A determination is made as to whether an instruction for which the fault was taken is a non-faulting instruction, wherein a non-faulting instruction is configured not to prematurely end based on the fault (1116). Based on the instruction being a non-faulting instruction, a determination is made as to whether the unit of memory is inaccessible in that default data is to be used for the unit of memory (1118), e.g., since the unit of memory is not backed by real memory. Based on the unit of memory being inaccessible, the inaccessibility status indicator is set (1120). Thereafter, the instruction is restarted (1122).

Based on the determining indicating the unit of memory is inaccessible, default data is provided for the unit of memory (1130). In one example, the unit of memory may be used to populate at least a portion of a memory operand to be used by an instruction, wherein it is the default data associated with the unit of memory that is used to populate the at least a portion of the memory operand (1132).

Advantageously, the above capability enables hardware to determine whether a page is inaccessible without requiring an interrupt to a control component, thus, saving thousands of processing cycles.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 12:
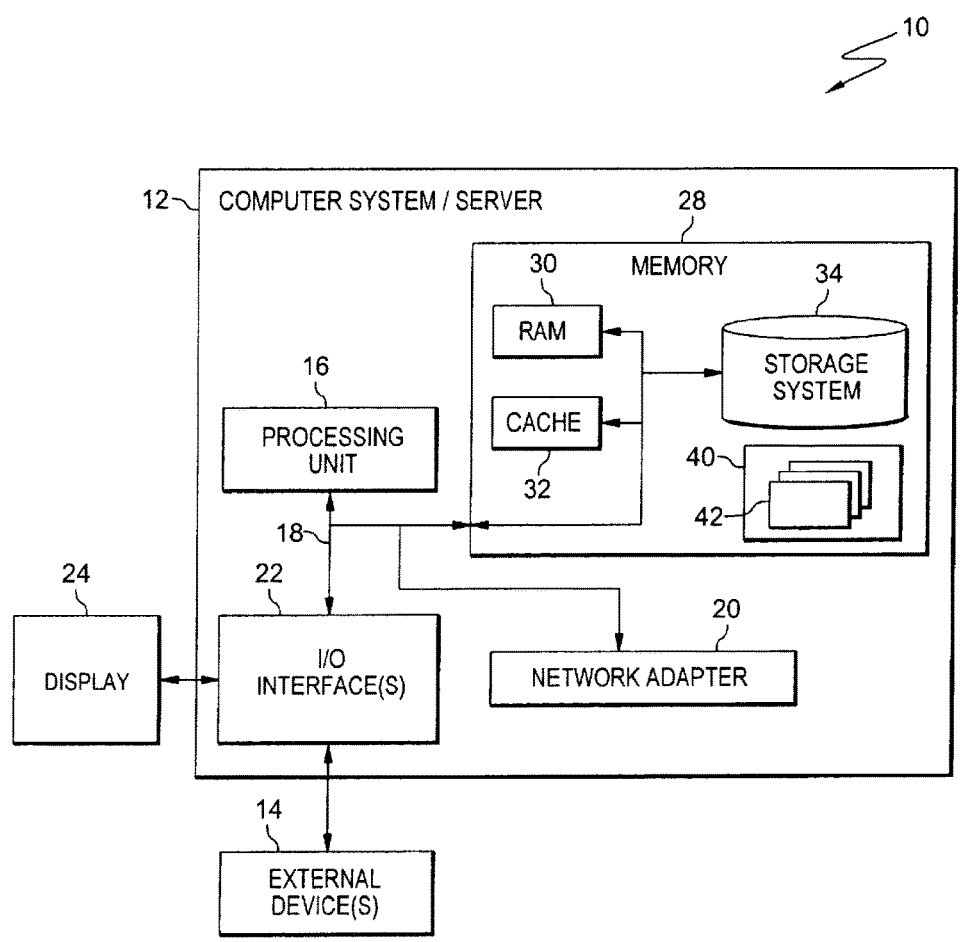
FIG. 12 depicts one example of a cloud computing node, in accordance with one or more aspects.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
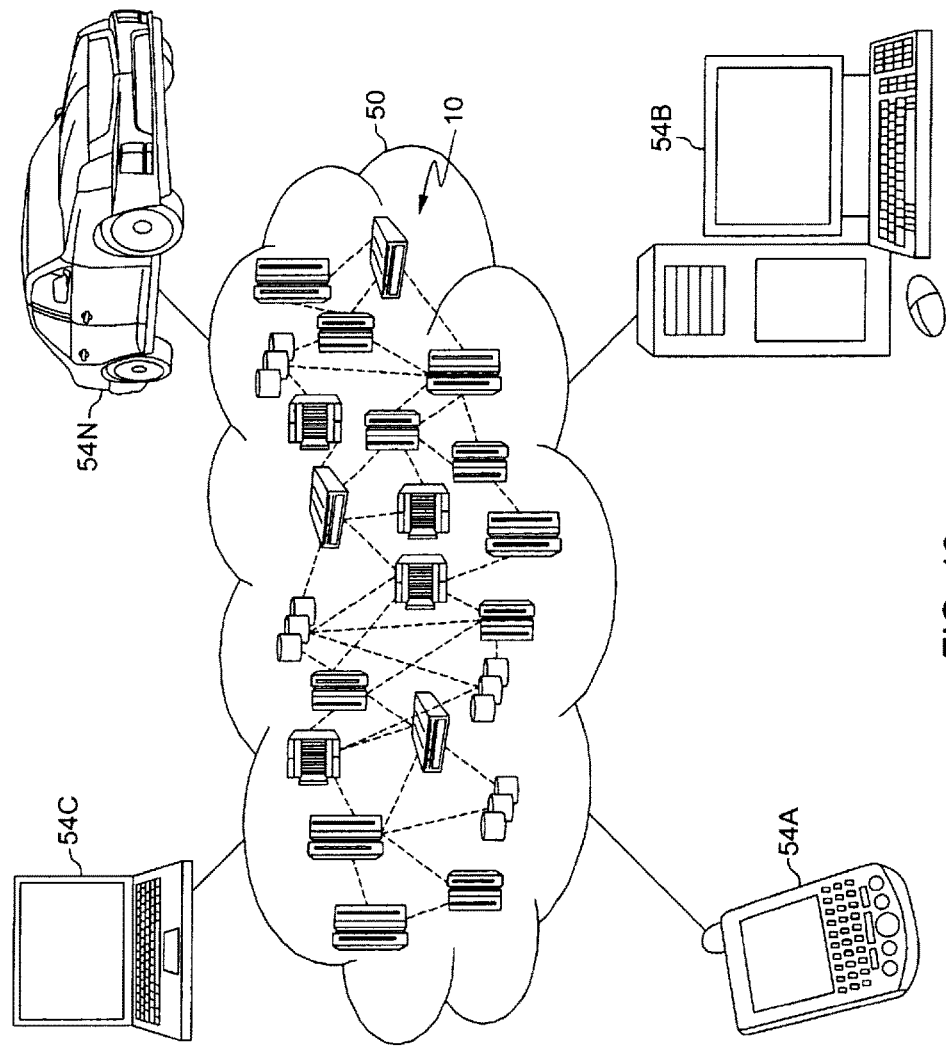
FIG. 13 depicts one embodiment of a cloud computing environment, in accordance with one or more aspects.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
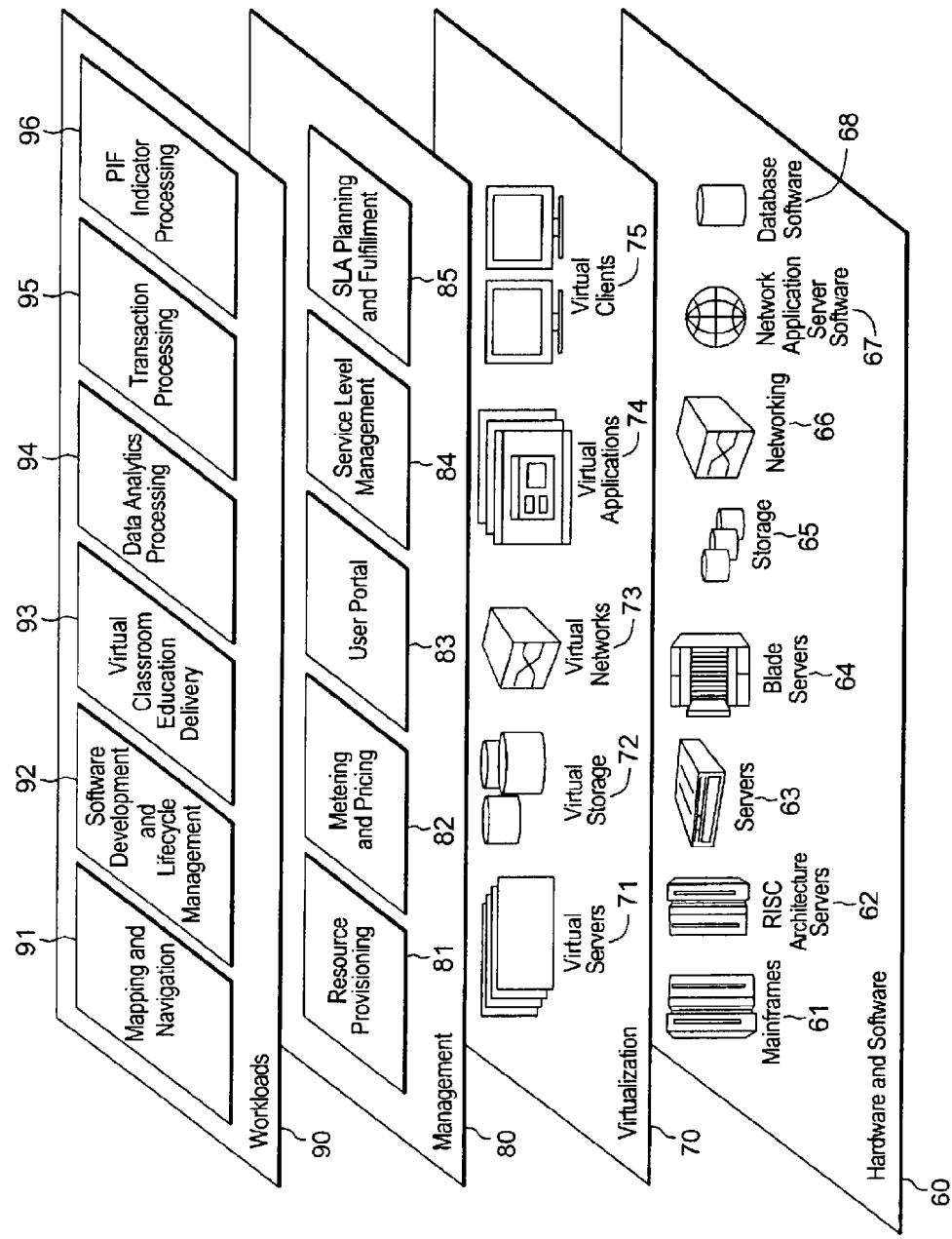
FIG. 14 depicts one example of abstraction model layers, in accordance with one or more aspects.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PIF indicator processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, said computer-implemented method comprising:
    receiving, by a control component, responsive to an instruction of an application executed by a processor, a fault for one unit of units of memory in a portion of memory including a first unit of memory and a second unit of memory;
    determining whether the unit of memory is inaccessible in that default data is to be used in place of the unit of memory;
    based on the unit of memory being inaccessible, setting an inaccessibility status indicator to a value, wherein the inaccessibility status indicator is in a selected location accessible to the processor absent use of a control component;
    restarting the instruction;
    determining, by a processor, without causing an interrupt to the control component managing the application, the unit of memory is inaccessible to the processor, wherein a memory unit is inaccessible if no address translation exists for the unit of memory that is accessible by the application, based on access permissions of the application, the determining being based on ascertaining the value of the inaccessibility status indicator in the selected location accessible to the processor absent use of the control component, indicating to the processor that the unit of the units of memory is inaccessible;
    providing the default data associated with the unit of memory to be used in place of the unit of memory to populate at least a portion of a memory operand to be used by the instruction, the default data being configurable data not obtained from memory;
    obtaining data from the other unit of memory of the first unit of memory and the second unit of memory that is accessible, the other unit of memory being different from the unit of memory that is inaccessible;
    configuring the default data to target requirements of the application;
    combining the data and the configured default data to provide combined data to be used for the request; and
    populating the memory operand to be used by the instruction of the application with the combined data.

2. The computer-implemented method of claim 1, wherein the determining whether the unit of memory is inaccessible in that default data is to be used in place of the unit of memory, further comprising:
    based on receiving the fault, determining whether the instruction is a non-faulting instruction, wherein a non-faulting instruction is configured not to prematurely end based on the fault; and
    based on the instruction being a non-faulting instruction, determining that the unit of memory is inaccessible.

3. The computer-implemented method of claim 1, wherein the selected location comprises an entry in an address translation data structure associated with the unit of memory that is inaccessible.

4. The computer-implemented method of claim 3, wherein the address translation data structure comprises a page table accessible by the processor.

5. The computer-implemented method of claim 1, wherein the selected location comprises an entry in a register, the entry associated with the unit of memory that is inaccessible.

6. The computer-implemented method of claim 1, wherein setting the inaccessibility status indicator to the value is also based on determining that address translation does not exist for the unit of memory that is inaccessible.

* * * * *